Jan. 5, 1965 W. SEEMANN 3,164,260
DISPLAY RACK CONSTRUCTION
Filed May 9, 1963 3 Sheets-Sheet 1
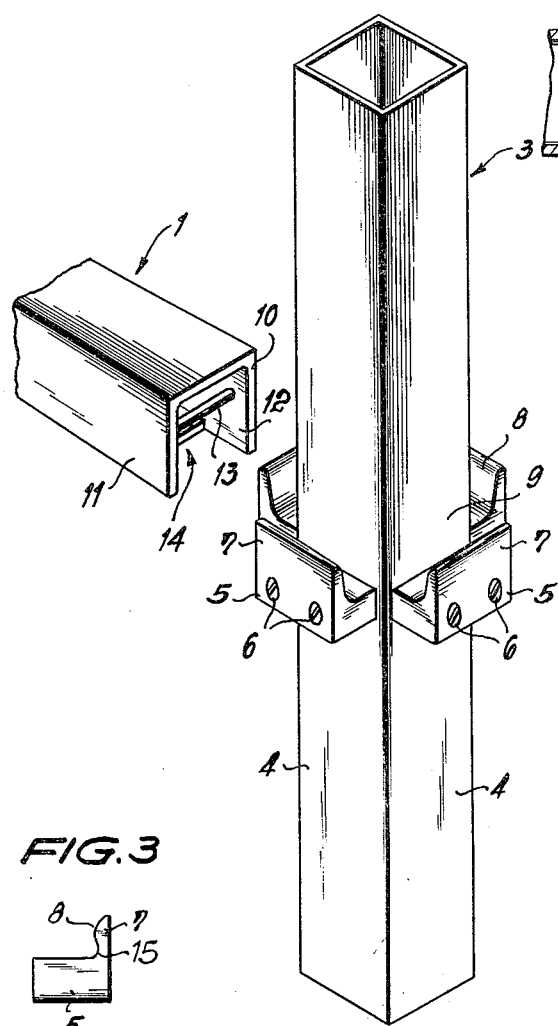
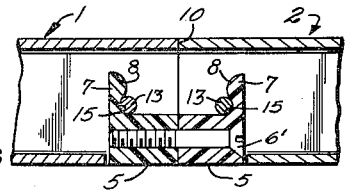
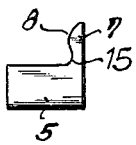
INVENTOR:
WERNER SEEMANN
ATTORNEYS

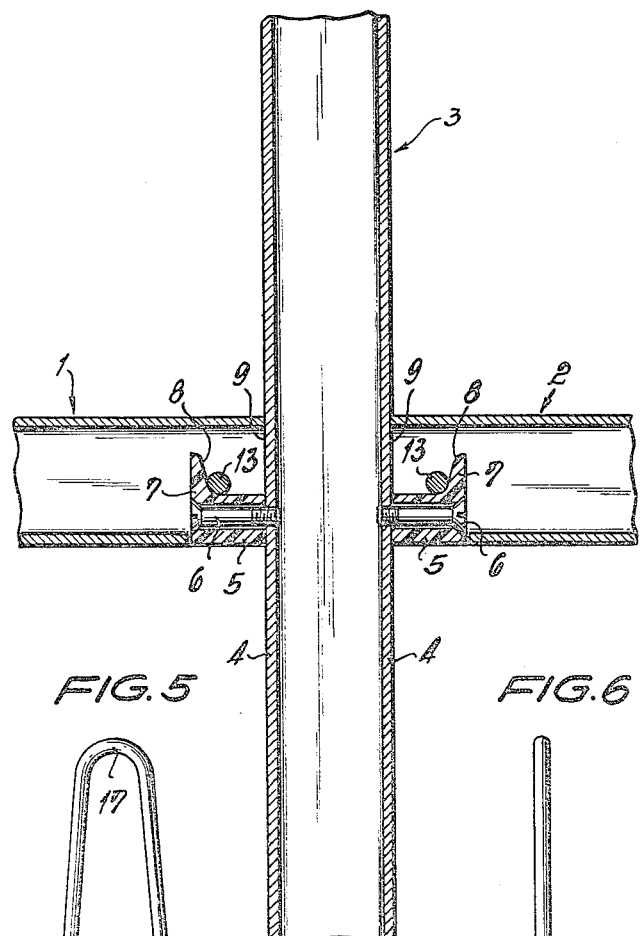
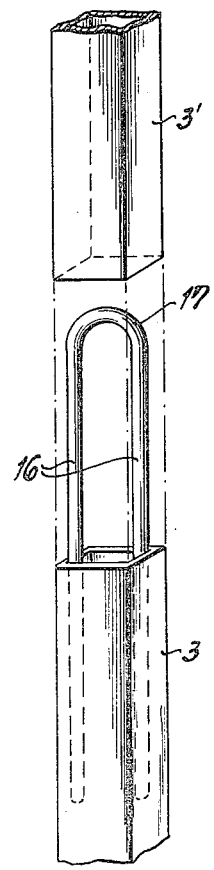
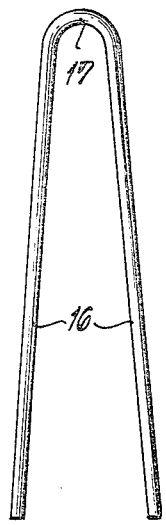
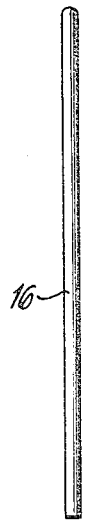

Jan. 5, 1965 W. SEEMANN 3,164,260
DISPLAY RACK CONSTRUCTION
Filed May 9, 1963 3 Sheets-Sheet 3

INVENTOR:
WERNER SEEMANN

By Eaton, Bell, Hunt & Seltzer
ATTORNEYS

United States Patent Office 3,164,260
Patented Jan. 5, 1965

3,164,260
DISPLAY RACK CONSTRUCTION
Werner Seeman, 48 Lilienstrasse, Munich, Germany
Filed May 9, 1963, Ser. No. 279,146
Claims priority, application Germany, July 17, 1962,
S 80,446
10 Claims. (Cl. 211—177)

This invention relates to an improved rack, frame, or shelf-supporting frame construction particularly devised for exhibition and advertising purposes and wherein the constructional elements or frame members thereof are joined together by novel connections which are easily assembled and disassembled.

Heretofore, some display racks and the like have been constructed from hollow-profile or tubular constructional elements or frame members joined together by means of junction connecting pieces, the tubular frame members being pressed together by being pushed over projections which extend outwardly from the junction connecting pieces. The disadvantage of connections of this kind is that they cease to provide a firm connection after considerable usage, and the racks lose their rigidity. Furthermore, the prior types of rack structures have had exposed unattractive ledges or interstices at the junction points.

It is a main object of this invention to produce a rack construction in which adjacent tubular frame members are firmly and tightly interconnectable, and are capable of disassembly, and in which the connecting elements and abutting surfaces are hidden from view to as great a degree as possible.

According to the invention this problem is solved by employing wedge-clamp joints at the junctures of adjacent pairs of rectangular tubular frame members with spaced clamping surfaces being provided on one of the frame members and defining a slot therebetween, and wherein a wedge element is provided on the other of the two frame members to be interconnected, the clamping surfaces forming the slot and the wedge, which effect the clamping joint, extending approximately parallel to the abutting surfaces of the frame members to be interconnected, and the angles of the clamping surfaces being so formed that the joint is self-locking.

The embodiment according to the invention offers the advantage that the rack construction can easily be assembled and dismantled by untrained personnel using no special tools, and that in an assembled condition the self-locking action of the clamping surfaces provides a sufficiently firm connection between the frame members.

It is another object of the invention to render the connection between the frame members as safe against, and as insensitive to, vibration and shocks as possible. To achieve this, the wedge angle of the effective clamping surfaces defined by the slot and the wedge is, according to the invention, noticeably smaller than the sum of the static friction angles of the cooperating clamping surfaces when clamped together, but preferably smaller than the sum of the sliding friction angles angles of these surfaces.

Preferably one of the clamping surfaces defined by each of the slot and wedge of the present invention is formed by the respective abutting surfaces of the frame members to be joined together, thus facilitating the joining together of the frame members, without interstices being formed therebetween.

In its preferred embodiment the invention comprises a plurality of elongate constructional elements in the form of frame members which are preferably tubular and of rectangular or polygonal cross-sectional configuration, and wherein adjacent first and second frame members, positioned in right-angular relationship, are interconnected by a novel wedge-clamp joint construction comprising hook-shaped members suitably secured to one or several lateral surfaces of the first frame member and a mating wedging member positioned within the second frame member and engaging a corresponding one of the hook-shaped members. The body of each hook-shaped member has a leg or projection thereon spaced from and extending substantially parallel to the corresponding lateral surface, with the side of the leg facing the adjacent lateral surface being inclined upwardly and slightly outwardly with respect to the adjacent lateral surface and forming, with the adjacent lateral surface, opposed clamping surfaces on the first frame member which define a slot or groove therebetween for receiving therein the mating wedging member of the second frame member. The wedging member extends transversely inside the second frame member and bears against the inclined clamping surface of said hook-shaped member while the adjacent end surface of the second frame member bears against the corresponding lateral surface of said first frame member thus clampingly interconnecting the two frame members.

A particularly simple construction, which is very cheap to be manufactured, can, according to the invention, be achieved by forming the wedging member as a preferably round transverse rail located inside the second frame member, wherein the transverse rail is preferably surrounded with a loosely fitting sleeve in order to prevent the clamping surface of the hook-shaped member from taking too much stress or being damaged, and to facilitate the locking. If tubular members are employed as constructional elements, this transverse rail can be inserted through holes in the lateral surfaces of corresponding frame members and may suitably be held in position by welding.

The clamping surface of each hook-shaped member, which coacts with the transverse rail, can be provided with a recess, within the range of the narrowest part of the slot, to enable the transverse rail to be locked therein.

According to the invention the frictional quality of the clamping surfaces can be increased by constructing them of hard rubber or plastic. Although the hook-shaped members may be made of steel or other metal, or of a metal alloy, hook-shaped members made of a firm, elastic plastic material such as, for example, perlon, have proved particularly suitable since, especially when employed in conjunction with a round transverse rail, the transverse rail produces an elastic indentation in the clamping surface and thus causes a particularly tight clamping.

It is a further object of this invention to produce a simple, secure and firm vertical in-line connection without interstices, between constructional elements in the form of tubular members, in which the abutting surfaces are hidden as completely from view as possible and each connection can be easily established and broken down.

This object is attained according to the invention by arranging inside the tubular members at least one hairpin-shaped steel spring bridging the junction.

When square-sectional, tubular members are employed as constructional elements, two hairpin-shaped steel springs, bridging the junction, can be arranged inside the constructional elements, crossing each other diagonally. If hexagonal, octagonal, etc., tubular members are employed as constructional elements, up to 3, 4 or more steel springs can correspondingly be arranged inside the constructional elements.

The hairpin-shaped steel springs are suitably manufactured from round steel. It is advantageous for the length of the legs of the steel springs to be four to ten times longer than the greatest internal width (inside width) of the constructional elements to be connected together.

Some of the objects of the invention having been stated, other objects will appear as the description proceeds when taken in connection with the accompanying drawings, in which—

FIGURE 1 is a partially exploded perspective view of a junction connection of constructional elements according to the present invention;

FIGURE 2 (Sheet 2) is a longitudinal sectional view of a junction connection in assembled condition;

FIGURE 3 (Sheet 1) is a side view of a modified embodiment of a hook-shaped constructional member or clamping member according to the invention;

FIGURE 4 is a schematic perspective representation of a vertical plug-and-socket joint between two constructional elements or frame members effected by means of a round steel spring, showing the two members to be connected in exploded relationship;

FIGURES 5 and 6 are front and side elevations of the round steel spring used to effect the plug-and-socket joint of FIGURE 4;

Figure 7:
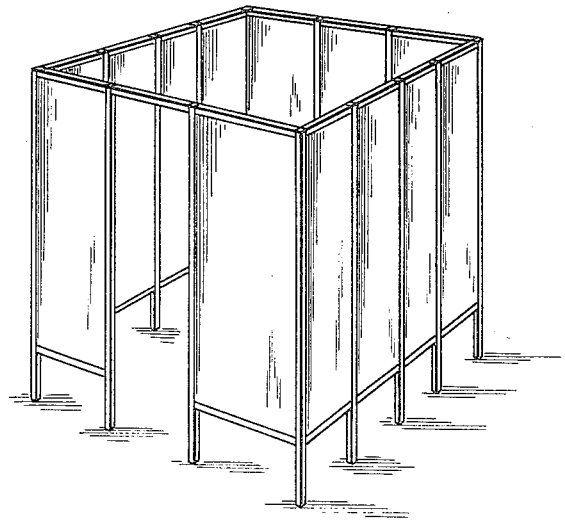
Figure 8:
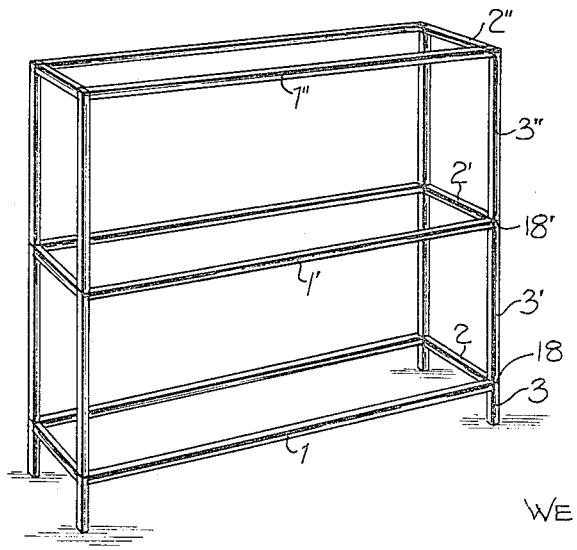

FIGURES 7 and 8 show in schematic, perspective representations an exhibition booth and a rack arrangement, respectively, as examples of structures utilizing constructional elements which may be joined together by means of junction connections formed according to the present invention; and FIGURE 9 (Sheet 1) is a sectional view showing the two horizontal frame members of FIGURE 2 connected together in alined and abutting relationship and utilizing the modified hook-shaped constructional member.

The junction connection shown in FIGURES 1, 2 and 3 is particularly devised for right-angled connection of horizontal constructional elements or frame members 1 and 2 in the form of square, tubular steel members, with the vertical constructional element or frame member 3, which likewise is in the form of a square, tubular steel member.

Hook-shaped constructional members or connecting blocks 5 are each anchored as by screws 6, to a corresponding lateral surface 4 of the vertical constructional element 3. Each hook-shaped constructional member 5 includes a vertical leg 7 provided with an inner surface 8 which faces toward, but is spaced from the associated lateral surface 4, and is inclined upwardly and outwardly with respect to said lateral surface at a small angle α (alpha), to form a clamping surface. The inclination of each clamping surface 8 is greater toward the top of the leg 7 than near the base. The clamping surface 8, together with the portion 9 of the opposite lateral surface 4, form spaced opposed clamping surfaces defining a slot or groove therebetween.

When frame members 1 and 2 are connected at right angles to frame member 3, end surfaces 10 (FIGURE 1) of the horizontal frame members 1 and 2 abut against the associated sections 9 of the lateral surfaces 4 of the frame member 3. A transverse rail or rod 13 extends between the two side walls 11, 12 of each horizontal frame member 1 and 2 and engages the clamping surface 8 of the corresponding block 5, and the rear surface of each transverse rail slides along the corresponding clamping surface 8 as the frame members 1, 2, 3 are joined together.

The distance between the rear surface of the transverse rail 13 and the front end surface 10 of each horizontal frame member 1, 2 is somewhat greater than the distance between the adjacent clamping surfaces 8, 9 at the base of each leg 7. Thus, when the wedge formed by each transverse rail 13 and the adjacent end surface 10 is pressed down into the slot formed by clamping surfaces 8, 9 a contact-pressure force arises between the clamping surfaces which insures that each end surface 10 fits firmly and closely against the lateral surface 4 of the upright constructional element 3. The greater inclination of the upper end portion of each surface 8 enables the rods 13 to be easily started over the legs 7 of the corresponding connecting blocks 5.

The width of each hook-shaped member 5 is such that they just fit into the interior of the hollow profile of the corresponding frame members 1 and 2. The bottom walls of frame members 1 and 2 are each provided with an open-ended slot 14 adjacent the corresponding end surface 10, and the hook-shaped members 5 are introduced into the interior of constructional elements 1 and 2 through said slots 14. When assembled, the lower surfaces of frame members 1 and 2 are in alinement with the lower surfaces of the hook-shaped members 5, as can be seen from FIGURE 2.

The hook-shaped members 5 may be manufactured from steel or other metal, or from a firm, elastic plastic material, such as perlon. In the latter instance, the clamping surface 8 yields elastically when the transverse rail 13 is pressed down on it, thus providing a form of lock on the transverse rail, which results in a particularly tight fit.

In the modified embodiment of the hook-shaped member shown in FIGURE 3 an indentation 15 is provided in the lower section of the clamping surface 8 so as to further facilitate locking the transverse rail in its end position. When the indentations 15 are provided in the lower sections of clamping surfaces 8, it is apparent that the distance between the upper portion of each surface 8 and the respective surface 4 of vertical frame member 3 in FIGURE 2 would be less than the distance between the inner surface of each rod 13 and the respective surface 4, and that the distance between surface 8 at the corresponding indentation or recess 15 and the respective surface 4 would be substantially the same as the distance between the inner surface of each rod 13 and the respective surface 4, so that each rod 13 must force outwardly the upper portion of the corresponding clamping surface 8 whenever it is inserted in or removed from the corresponding indentation 15 with the adjacent end of the corresponding horizontal frame member against the vertical frame member 3. Of course, due to the elastic nature of the material of which the hook-shaped members are made, the upper portions of legs 7 will return substantially to their normal relaxed position following insertion of the corresponding rods 13 in the indentation 15 or removal of rods 13 from between legs 7 and vertical frame member 3.

The frame members 1 and 2 may be joined together in a straight line by employing a double-hook-shaped constructional member made up of two hook-shaped members 5 (FIGURE 9). In this instance, the end surfaces 10 of the frame members 1 and 2 are pressed directly against one another.

It is apparent that the double-hook-shaped member may be formed by securing together two of the hook-shaped members 5 by means of the corresponding screws 6, with the proximal ends of the bodies thereof in FIGURE 9 abutting each other or being formed integral with each other for interconnecting proximal ends of the frame members 1, 2 in abutting relationship and so they extend in a straight line; i.e., the end surfaces 10 of frame members 1, 2 would be pressed against each other. Such interconnection of the two alined frame members is very strong when formed from hook-shaped members having recesses or indentations 15 therein engaged by the transverse rods 13 as shown in FIGURE 9. Its is apparent that the distance between the upper portions of legs 7 in FIGURE 9 is less than the distance between the distal clamping surfaces of rods 13, and that the distance between legs 7 at the indentations 15 is substantially the same as the distance between said distal clamping surfaces, when the end surfaces 10 of members 1, 2 are in abutting relationship. Thus, when assembling the connection as in FIGURE 9, the elastic nature of the material of which the hook-shaped members 5 are made permits surfaces 8 to be forced apart of the rods 13 as they are inserted between surfaces 8 and, as the rods 13 enter indentations 15, the surfaces 8 substantially return to their normal relaxed positions.

In FIGURE 4 another means is shown for interconnecting the proximal ends of two square, hollow-profile constructional elements or tubular frame member 3, 3' in upright or vertical positions, the frame members 3, 3' being shown in exploded or spaced apart relationship in FIGURE 4 for purposes of clarity. The connecting means of FIGURE 4 comprises a hairpin shaped spring 16 made of round steel.

The length of hairpin-shaped steel spring 16 should be approximately six times as large as the internal diagonal width of the said square tubular members. The outside diameter of the curvature 17 of spring 16 should be somewhat smaller than the internal diagonal width of frame members 3, 3'. The steel spring 16 arranged diagonally inside the alined tubular frame members and bridging the junction, surprisingly provides a completely firm and sufficiently stable vertical connection for the frame members, which is very resistant to bending and shearing forces.

When the frame members 3, 3' to be connected together vertically are placed in position, spring 16 causes their lateral surfaces automatically to assume positions parallel to one another, so that the connection is smooth and substantially without interstices on all sides and scarcely visible if the abutting surfaces of the frame members 3, 3' are sufficiently plane. The rigidity of the joint can further be increased by arranging two springs 16 which cross each other diagonally. Using square, hollow-profile or tubular members with an internal diagonal width of approximately 1.45 centimeters, it was found that a hairpin-shaped steel spring made of 0.3 centimeter thick round steel with a leg length of 13 centimeters and an external diameter of the curvature 17 of approximately 1.2 centimeters was particularly advantageous.

The exhibition booth shown in FIGURE 7 is constructed of square tubular frame members or rods which are interconnected by means of the wedge-clamp joints according to the invention. The wall areas between the rod-shaped constructional elements are covered by plates hung preferably by hooks.

In the rack construction as shown in FIGURE 8 the vertical frame members 3, 3' and 3'' are interconnected at their abutting points, as indicated by reference numerals 18 and 18', by means of the hairpin-shaped steel springs which, according to the invention, serve to establish vertical connections. The horizontal connections between the frame members 1, 3 and 2, 3, as also between 1', 3' and 2', 3', and as also between 1'', 3'' and 2'', 3'' take the form of wedge-clamp connections according to the invention.

In the drawings and specification there has been set forth preferred embodiments of the invention and, although specific terms are employed, they are used in a generic and descriptive sense only and not for purposes of limitation, the scope of the invention being defined in the claims.

I claim:

1. A wedge-clamp connection connecting together flat abutting end surfaces of a pair of longitudinally alined frame members whose proximal ends, at least, are hollow; said connection comprising:
    (a) a body fitting in the hollow proximal ends of said members and including a pair of longitudinally spaced first clamping surfaces extending substantially parallel with, spaced from, and facing toward said abutting end surfaces,
    (b) a wedging member carried by each frame member, each wedging member having a second clamping surface facing away from said abutting surfaces and engageable with the corresponding first clamping surface, and also being spaced from and extending substantially parallel with said abutting surfaces, and
    (c) said first clamping surfaces each extending at an angle relative to said abutting surfaces such that the wedge-clamp connection is self-locking.

2. A structure according to claim 1, in which said first clamping surfaces extend upwardly from said body and each first clamping surface is provided with an indentation therein adjacent the juncture thereof with said body and in which indentation the corresponding wedging member seats while said frame members are interconnected.

3. A structure according to claim 1, wherein said body and its first clamping surfaces are integral with each other and are made of an elastic material, and the distance between said first clamping surfaces being such relative to the distance between said second clamping surfaces that said second clamping surfaces are in pressure engagement with said first clamping surfaces.

4. A structure according to claim 2, wherein said body and its first clamping surfaces are integral with each other and are made of an elastic material, the distance between the portions of said first clamping surfaces above said indentations being less than the distance between said second clamping surfaces, and the distance between said first clamping surfaces at said indentations being substantially the same as the distance between said second clamping surfaces whereby, during assembly of said connection, said first clamping surfaces will be forced apart as said wedging members are inserted between said first clamping surfaces and then will move toward each other as said second clamping surfaces enter said indentations.

5. Means for detachably interconnecting a pair of first and second frame members in angular relationship comprising
    (a) a hook-shaped member of elastic material comprising
        (1) a body fixed to one first surface of the first frame member and projecting outwardly therefrom,
        (2) a leg integral with and projecting upwardly from said body in substantially parallel relation to and spaced from said first surface,
        (3) the lower portion of said leg at its juncture with said body having a recess therein extending throughout the width thereof,
    (b) said second frame member being hollow at least adjacent one end thereof for receiving said hook-shaped member therein,
    (c) a transverse rod fixed to and disposed within the hollow end of said second frame member and having a rear second surface spaced from the adjacent end of said second frame member a distance substantially the same as the distance from the surface of the lower portion of said leg defined by said recess and the first surface of the first frame member to which said body is fixed, and
    (d) the distance between the upper portion of said leg and said first surface being less than the distance between said first and second surfaces so that said rod must force outwardly the upper portion of said leg whenever it is inserted in or removed from said recess with the adjacent end of said second frame member engaging said first surface and whereby the upper portion of said leg will return substantially to its normal relaxed position following insertion of said rod in said recess or removal of said rod from between said leg and said first surface.

6. In a structure according to claim 5, in which said first frame member extends vertically and said second frame member extends horizontally, the lower portion of said second frame member having a slot therein for receiving therein the lower portion of said hook-shaped member, and said recess and said rod being spaced above the lower portion of said second frame member a distance such that the lower surface of the hook-shaped member occupies a position in substantially flush relation to the lower surface of said second frame member when said pair of frame members are interconnected.

7. A structure according to claim 5, in which said rod is circular in cross-section.

8. A structure according to claim 5, in which said elastic material has the pliability of hard rubber.

9. A structure according to claim 5, in which said material is an elastic plastic material.

10. A device for connecting a pair of frame members together comprising a hook-shaped member including a body having a substantially flat upper surface, a leg projecting upwardly from and entirely across said surface, said leg having a recess extending thereacross in its face adjacent said surface and at its juncture with said surface and adapted to receive a rod therein extending across one end of a corresponding frame member, and at least said leg of said member being elastically yieldable so it may be forced outwardly of its normal position upon a certain amount of outward force being applied thereto and will return to its normal position upon being released from said force.

References Cited by the Examiner

UNITED STATES PATENTS

| | | | |
|---|---|---|---|
| 1,030,494 | 6/12 | Sussman | 5—291 |
| 1,445,318 | 2/23 | Horwich | 5—294 X |
| 1,715,342 | 5/29 | Rubin | 5—294 |
| 1,792,100 | 2/31 | Kohler | 287—54 |
| 1,875,805 | 9/32 | Dickson | 5—294 |
| 2,508,668 | 5/50 | Gascoigne | 287—2 |
| 2,616,135 | 11/52 | Holden | 20—92.4 |
| 2,705,568 | 4/55 | Stewart | 248—224 X |
| 2,815,130 | 12/57 | Franks | 211—148 |
| 2,962,170 | 11/60 | Best | 211—182 |
| 2,972,495 | 2/61 | Yalen | 287—54 |
| 2,984,363 | 5/61 | Lang | 211—182 |
| 3,000,656 | 9/61 | Hollaender | 287—2 |
| 3,089,716 | 5/63 | Berkowitz | 287—126 X |

FOREIGN PATENTS

| | | |
|---|---|---|
| 380,457 | 12/22 | Germany. |
| 1,166,740 | 6/58 | France. |

CLAUDE A. LE ROY, *Primary Examiner.*